METHOD AND APPARATUS FOR ORIENTING MAGNETIC PARTICLES OF A RECORDING MEDIUM AND MAGNETIC RECORDING MEDIUM

Filed July 23, 1962 2 Sheets-Sheet 1

INVENTOR.
Marvin Camras
BY
Hill, Sherman, Meroni, Gross & Simpson
ATTORNEYS

METHOD AND APPARATUS FOR ORIENTING MAGNETIC PARTICLES OF A RECORDING MEDIUM AND MAGNETIC RECORDING MEDIUM

Filed July 23, 1962 2 Sheets-Sheet 2

INVENTOR.
Marvin Camras

BY

Hill, Sherman, Meroni, Gross & Simpson

ATTORNEYS

United States Patent Office 3,256,112

Patented June 14, 1966

3,256,112

METHOD AND APPARATUS FOR ORIENTING MAGNETIC PARTICLES OF A RECORDING MEDIUM AND MAGNETIC RECORDING MEDIUM

Marvin Camras, Glencoe, Ill., assignor to IIT Research Institute, a corporation of Illinois Filed July 23, 1962, Ser. No. 211,562
15 Claims. (Cl. 117—93.2)

This invention relates to a method and apparatus for producing magnetic record media and to a magnetic record medium produced thereby.

There have been several attempts in the prior art to provide magnetic record media of improved characteristics by the use of magnetic orienting fields which are applied to the record medium while the magnetizable particles are in a mobile condition in a suitable non-magnetic binder. Such prior art methods have claimed some improvement in the form of increased output, but it now appears that a new concept concerning the behavior of the magnetizable particles as the result of the application of magnetic orienting fields leads to highly significant improvements in the characteristics of magnetic record media and particularly leads to a very important reduction in noise level as compared to the prior art orienting methods.

Such new concept has been obtained in part by the analysis of the forces among an array of magnetizable particles, and also by microscopic examination of slides having actual record coating materials thereon. It has been concluded that the magnetization of the particles as a result of a steady unidirectional magnetic orienting field produces a disruption of the desired orientation after the particles leave the steady magnetic orienting field while still being in a mobile condition, due to the magnetic forces between the individual magnetized particles themselves acting in the absence of an extenal field. It is concluded that even while a D.C. orienting field is present there are lateral forces between the magnetized particles which tend to separate laterally adjacent particles or groups of particles.

In order to avoid this disruption of the desired orientation of the particles, it has been conceived that the particles after being subjected to the final orienting field should be in a demagnetized condition. In the case of multidomain particles, each individual particle may be left with a minimum external field so as to have little or no effect on adjacent particles. In other instances such as the case of single domain particles which cannot themselves be placed in a neutral condition, it has been concluded that each scanning increment of the record medium should be occupied by substantially equal numbers of particles of each of two opposite polarities. In the ideal case laterally adjacent pairs of particles would have substantially the same size and opposite polarity and would be in direct lateral alignment so as to attract each other and "coalesce" into a substantially neutral pair of particles as the particles leave the final orienting field, without any substantial change in the orientation of the particles. In the more general case of different size particles or particles which are not in direct lateral alignment, it is desired that laterally adjacent particles or groups of particles attract each other so that the particles or groups move laterally as the amplitude of the orienting field decreases to form compact regions with a minimum external field and without substantial change in the orientation of the particles.

Specifically a preferred orienting procedure in accordance with the present invention resides in subjecting the particles while in a mobile condition to a magnetic field which has a direction generally parallel to a predetermined desired direction of orientation, and reversing the polarity of the orienting field as a function of time and progressively decreasing the amplitude of the field acting on the particles to subject each of the particles of the record medium to a number of reversals of field polarity of successively decreasing amplitude while the particles are in a mobile condition. After subjecting the particles to the reversing polarity magnetic field of progressively decreasing amplitude, the particles are immobilized in the binder prior to the application of any further external magnetic fields of effective amplitude to magnetize the particles.

By way of example, one magnetic tape record medium produced in accordance with the present invention showed a substantially lower A.C. noise level than a comparable longitudinally oriented commercial magnetic tape record medium, with comparable output level at 10,000 cycles per second and a comparable frequency of maximum response. It has in fact been confirmed by means of a microscope that the magnetic forces between the particles themselves are not as disruptive of the desired orientation when the method of the present invention is employed as in the case when the particles leave a direct current type orienting field.

In one prior art orienting system, a magnet utilizing ferromagnetic material produces a direct-current orienting field which in part extends at right angles to the desired direction of orientation of the particles. It is found on the basis of microscopic examination that such an orienting field causes the particles to form clusters or trees which turn end for end as they travel through the right angle part of the orienting field. The resulting severe clustering of the particles is not eliminated by the subsequent passage through a longitudinal part of the orienting field.

Based in part on this observation, a further concept has evolved which is of particular utility when used with a final A.C. magnetic orienting field as described above, but which is also of substantial utility when used with a final D.C. orienting magnetic field. This concept has to do with the application of a succession of magnetic fields of different direction followed by a final magnetic field in the desired direction of orientation.

Specifically, the present invention includes the further teaching that the particles should be subjected to a plurality of magnetic orienting fields directed at successive acute angles relative to the predetermined direction of orientation which is desired and that right angle fields should be avoided. It is necessary to subject the particles to the successive acute angle magnetic orienting fields for sufficient time periods so that a substantial proportion of the particles of the record medium are oriented substantially in the directions of the respective magnetic fields in succession. This action releases obstructed particles and results in a more uniform orientation of the particles by the final orienting field.

Another prior art orienting system subjects the particles simultaneously to a direct current longitudinal magnetic field and to an alternating magnetic field at right angles to the desired direction of orientation and then to a final direct current orienting field having a direction corresponding to the desired direction of orientation. However the A.C. field used in the prior art alternates so rapidly that it cannot be followed by the particle matrix, and the average field at any point in this apparatus is at all times in the desired direction of orientation. Hence it does not have the effect of the spaced fields described here which vary in their average direction. The final D.C. magnetic field would leave the particles in a disruptive state because of the forces between the particles as previously described.

It is therefore an important object of the present invention to provide an improved method and apparatus for orienting magnetic particles of a record medium in a predetermined direction prior to immobilization of the particles in a binder which method results in a record medium having a substantially reduced A.C. noise level as compared to presently available magnetic record media.

It is a further object of the present invention to provide an improved method and apparatus for orienting magnetic particles of a record medium in a predetermined direction prior to immobilization of the particles in a binder which method results in a record medium having a substantially reduced D.S. noise level as compared to prior art oriented magnetic record media.

It is another object of the present invention to provide a method and apparatus for orienting magnetic particles of a record medium which provides a smoother record medium active surface than prior art orienting methods.

A further object of the invention is to provide a magnetic record medium having a substantially lower A.C. and/or D.C. noise level than unoriented or conventionally oriented magnetic record media.

A feature of the present invention resides in the provision of a magnetic record medium wherein the particles are relatively uniformly oriented and have not been subjected to the disruptive inter-particle forces resulting from magnetization by a D.C. orienting field.

A further feature of the invention comprises a magnetic record medium wherein the particles have been set in a binder after the application of an A.C. orienting field extending in the desired direction of orientation which has effectively demagnetized the record medium.

Another feature of the invention resides in provision of a magnetic record medium wherein the magnetizable particles are relatively homogeneously dispersed in a binder in an oriented condition and have not been subjected to the disruptive effect of a magnetic field at right angles to the direction of orientation prior to immobilization of the particles in the binder.

Still another feature of the invention resides in the provision of a magnetic record medium having oriented single domain particles or other permanently magnetized particles of reversible polarity which have been subjected to an A.C. orienting field extending in the desired direction of orientation and then allowed to regroup in accordance with the mutual forces therebetween prior to immobilization thereof in a binder.

Other objects, features and advantages of the present invention will be apparent from the following detailed description taken in connection with the accompanying drawings in which.

Figure 1:
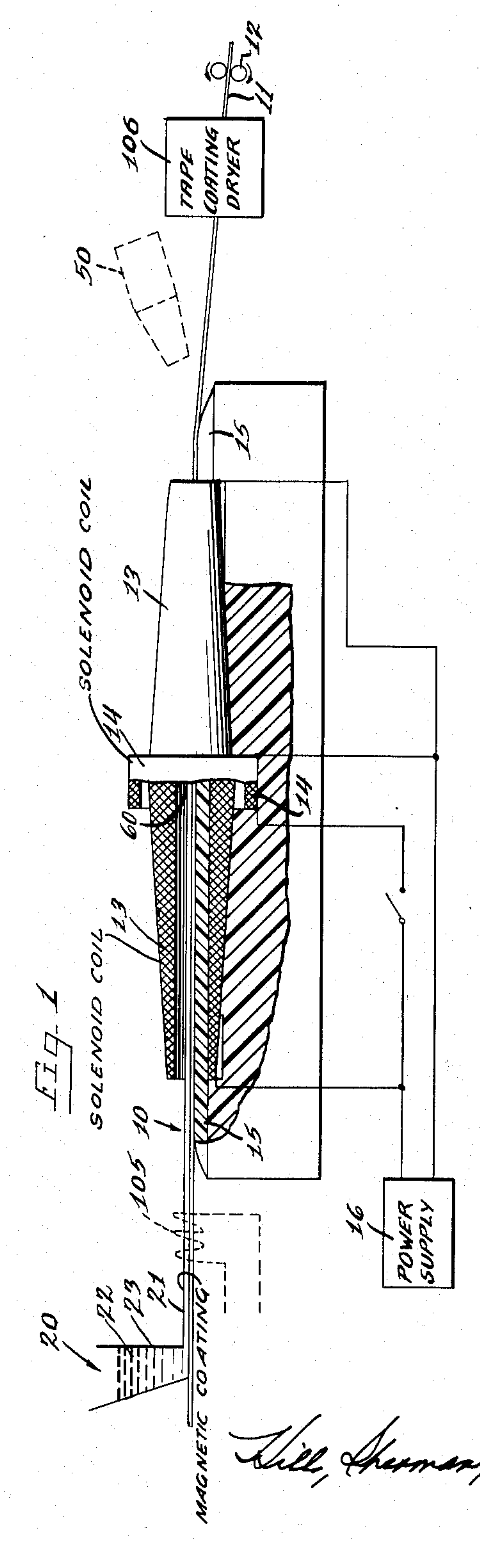
FIGURE 1 is a somewhat diagrammatic side elevational view partly broken away and in section of a solenoid arrangement for carrying out the principles and teachings of the present invention.
Figure 2:
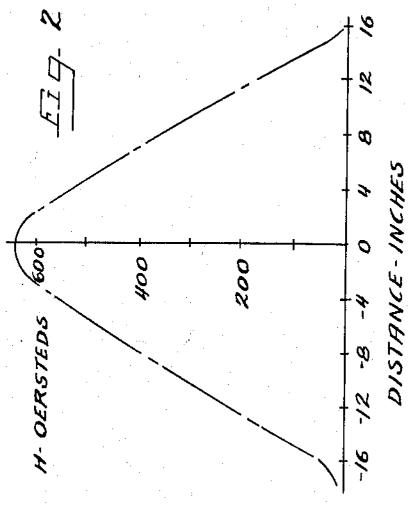
FIGURE 2 is a graphical illustration of field distribution for the tapered inner solenoid coil only of FIGURE 1.
Figure 3:
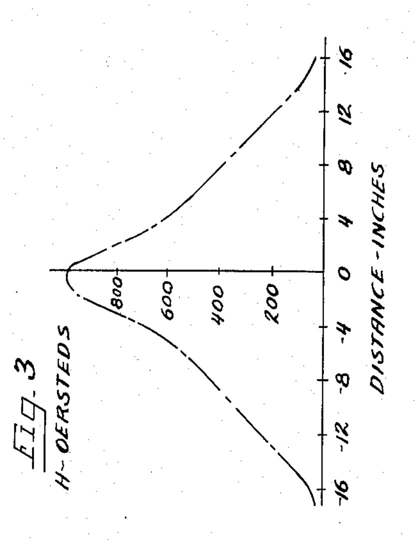
FIGURE 3 is a graphical illustration of field distribution utilizing both of the A.C. solenoid coils illustrated in FIGURE 1.

*Description of the structure of FIGURES 1–3*

In FIGURE 1, a record medium base 11 of non-magnetic material and of tape configuration is moved along a path 10 by a suitable transport means indicated diagrammatically at 12. Solenoid coils are indicated at 13 and 14 which may be connected in series or in parallel with an alternating current supply 16. The tape base 11 may be guided by means of a supporting table 15 of non-magnetic material so as to travel substantially along the central axis of the solenoids 13 and 14.

A coating applicator is indicated at 20 for supplying a layer 21 of a coating composition 22 to the tape base 11. A gate or blade element 23 of the applicator 20 may be vertically adjustable to determine the thickness of the layer 21 on the tape base 11.

It has been found that a solenoid with a steep gradient or high rate of change of magnetic field as a function of distance along the path 10 of the record medium exerted undesirable forces on coatings, so that a solenoid such as indicated at 13 in FIGURE 1 was designed with a pattern having a gradual build up to its maximum field and an equally gradual decline. A plot of field intensity versus distance along the axis of the tapered solenoid 13 is shown in FIGURE 2. For certain experiments requiring higher maximum fields the coil was augmented by a ring shaped additional winding 14 as shown about the central part of the tapered solenoid 13 in FIGURE 1. This allows a high maximum field combined with a gradual decrease of field at critical orienting regions. In the region where the field decreases below the coercive force of the magnetic material, the A.C. field frequency should be high enough to prevent disruptive movement of the particles. The combined field of the solenoids 13 and 14 is plotted in FIGURE 3. By the use of these solenoids, very quiet tapes were obtained with standard oxides.

In some instances it has been found preferable to allow the layer 21 to set while still in the solenoid 13 and thus to immobilize the particles while they are under the influence of the external magnetic field. In other instances it is preferable to keep the layer in a fluid state until the external field acting on the particles has decreased below a critical value so that the particles have the opportunity of arranging themselves in an advantageous manner as a result of the interaction of the magnetic forces of the particles themselves.

Figure 5:
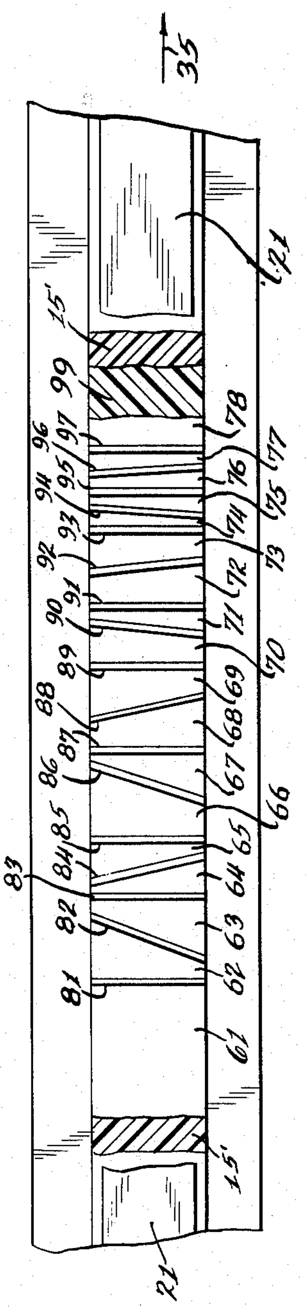
FIGURE 5 is a diagrammatic horizontal sectional view taken generally along the line V—V in FIGURE 4.
Figure 4:
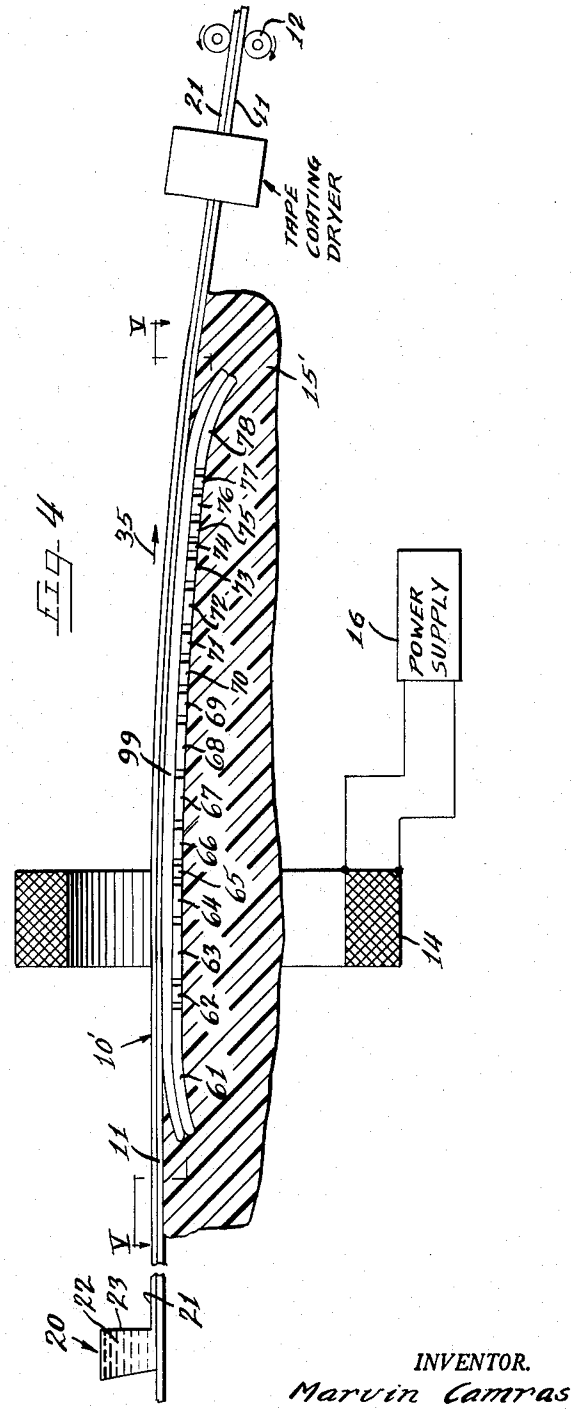
FIGURE 4 is a diagrammatic view partly in section illustrating a modified orienting system in accordance with the teachings and principles of the present invention.

*Description of the structure of FIGURES 4 and 5*

The arrangement of FIGURES 4 and 5 represents a modification of the system of FIGURE 1 wherein solenoid 13 is omitted and the supporting table 15' is provided with a series of silicon steel pole pieces 61–78 defining non-magnetic gaps 81–97. The path 10' of the record medium is spaced above the surface of pole pieces 61–78 by means of non-magnetic material 99.

*Example of a coating composition for the embodiments of FIGURES 1–3 and 4–5*

To form a coating composition 22 for FIGURES 1–5, magnetic material in the form of 5 grams of gamma ferric oxide such as C. K. Williams type M3260, is mixed with 0.5 gram of raw castor oil or Rohm and Haas G–61 plasticizer, and with 5 grams of commercial xylene. The mixture is milled in a glass container with glass balls until homogeneously dispersed. (More or less xylene may be used to give optimum consistency for milling.) It has been found that non-magnetic containers and balls in milling give quieter and better record media. Preparation of the magnetic oxide is shown in Camras Patent 2,694,654. To the above dispersion is added 5 grams of a solution of 7½ parts by weight 125–175 second R.S. nitrocellulose in 72½ parts by weight amyl acetate and 20 parts by weight xylene. This is milled further, with amyl acetate added toward the end of the milling cycle for proper coating viscosity. A thixotropic mixture may be obtained by the above method, which is beneficial in conjunction with the orienting method of the present invention. The product is filtered through a fiber glass paper (such as Gellman type E) which allows the fine magnetic suspension to pass but removes oversize particles and foreign matter, using suction, and stirred into the knife coating apparatus 20 set to give a dried film of desired thickness, usually about 0.3 to 0.5 mil (1 mil=$10^{-3}$ inch) although thinner coats are desirable. A finished layer may also be built of several coats. A suitable base 11 for the tape is 1 mil thick cellulose acetate. The record medium base 11 may travel at a speed of about 30 inches per minute where the applied field has a frequency of 60 cycles per second or more.

*Example of orienting procedure for the embodiments of FIGURES 1–3 and 4–5*

While the deposited coating is still in a fluid or gel state it is moved along a path such as indicated at 10 on a non-magnetic carrier or base 11 by means of a moving means such as indicated at 12 so that the magnetizable particles move through the magnetic orienting field of the orienting coil or coils.

Preferably the supporting table 15 has a succession of magnetic field directors as shown in FIGURES 4 and 5 in association with a winding such as indicated at 14. The table of FIGURES 4 and 5 has a series of silicon steel pieces defining successive local orienting fields. The solenoid 14 provides a longitudinal field pattern where longitudinal orientation of the particles is desired and the successive pole pieces superimpose on the longitudinal field pattern a succession of fields which are offset in the direction of movement of the record tape indicated by arrow 35 and extend variously in the same direction as and at acute angles to the main field which is in the direction of tape movement. The result is an influence which tends to align the particles all in the same direction, plus an effective agitation that dislodges particles from obstructions that interfere with the aligning action. The agitating action also liquifies thixotropic suspensions temporarily to allow effective migration of particles followed by an action which locks the particles in place. The silicon steel pieces may be spaced about 0.030 inch apart and separated about 0.015 inch from the record.

A high frequency field, for example having a frequency substantially greater than 60 cycles per second, is desirable where the tape moves at a speed about at commercial coating speeds as well as at the slower speed of the experimental coater. If the frequency of the field is sufficiently high in relation to the viscosity of the binder, the particles will be unable to respond to the reversals of the field, and mechanical movement of the particles other than alignment in the field direction will be substantially avoided. For a relatively high frequency magnetic field such as one above audio frequencies, ferrite material may be substituted for silicon steel as the material for the pole pieces.

*Conclusions concerning coating composition and orienting procedure*

Under correct conditions of viscosity, dispersion, dilution, coating thickness and field, the magnetic particles form a network of fine elongated fibers in a non-magnetic matrix. The beneficial results of this procedure include increased mechanical strength of the record medium as well as low noise level and high output.

The castor oil (or equivalent) has an affinity for the magnetic particles and surrounds them with a lubricant coat. However the castor oil does not dissolve the nitrocellulose, and the coated particles are initially in the form of islands in the nitro-cellulose binder matrix.

Severa factors are believed to promote the formation and stability of a properly oriented record medium.

(1) With a decreasing alternating current field instead of a D.C. field as the final orienting field, the particles are found to leave the final orienting field with little or no mutual disintegrating forces. With a direct current steady amplitude field (where the particles are all magnetized with the same polarity after the field is removed) unbalanced disruptive forces are present when the particles leave the orienting field. A high frequency field is desirable.

(2) A gelling action of the binder hinders movement after the desired pattern is obtained. This action was observed in the example of formulation given previously. With a high enough aligning field frequency, heat is generated within the particles by hysteresis losses; the particles cool when passing out of the field and the binder solidifies.

(3) A bodied dispersion where a relatively dilute binder forms a suspension of working viscosity and the particles are somewhat separated promotes the alignment of the particles with respect to an applied orienting field while the binder is in liquid form; in drying the coating becomes compacted to a thin concentrated layer.

(4) An agent such as castor oil with strong affinity for the particles which forms a coating on them that is not removed by the binding mixture is advantageous. This also helps in filtering the particles.

The improved process and tape structure applies not only to presently commercially used magnetic tape oxides, but also to materials of better magnetic properties or finer particles which will give still further reduction in noise, or increase in output or in high frequency response.

While a reduction in background noise of about 15 decibels below the noise level of the best commercial tape has been obtained utilizing the arrangement of FIGURES 4 and 5, a substantial but lesser degree of improvement may be obtained utilizing structures as represented in FIGURES 1, 2 and 3 where the magnetic pole pieces are omitted from the supporting table 15.

A magnetic record tape produced in accordance with the method of the present invention is found to have a smooth glass-like surface substantially smoother than a comparable oriented commercial magnetic record tape and to give exceptionally stable high frequency response.

*Additional details with respect to the described embodiments*

The following additional details concerning the actual experiments as represented in FIGURES 1–5 are presented by way of example and not of limitation.

The gamma ferric oxide particles referred to herein are typical of those presently almost universally used in magnetic record tapes. Such particles are acicular and have a length of the order of ½ micron (one micron=$10^{-6}$ meter) and a diameter of the order of $\frac{1}{10}$ micron. The particles are single domain particles having their axis of magnetization in the length direction. The particles when formed into a coating layer of about .4 mil thickness have a coercive force of about 275 oersteds (for an applied saturating field of the order of 1000 oersteds) and a residual magnetization of about 1000 gauss.

In applying the coating composition 22 including the single domain particles and the binder to the tape base 11, the gate 23 of the applicator 20 may be set at a height of about 5 mils above the tape base. This will give an active layer 21 with an initial thickness somewhat less than 5 mils, but with a coercive force of about 275 oersteds, that is substantially the same as the coercive force of the final tape having a dried coating of thickness of about .4 mil.

The tape base 11 may have a width of 2 inches and the pole pieces a width of about 2½ inches. In FIGURES 4 and 5, the coil 14 may be energized from alternating current of amplitude to produce a maximum field in the path of the record medium above the gaps such as 97 in FIGURE 5 sufficient to align the particles substantially in the direction of movement of the record medium. The particles of the record medium should be subjected to a number of cycles of the A.C. field of successively decreasing amplitude after having been subjected to an amplitude of at least the coercive force of the record medium, for example 275 oersteds, as the particles leave the orienting system. Thus the region of decreasing field may have a length in the direction of tape movement corresponding to the distance the record medium moves in several cycles of the applied field. The A.C. field should place the record medium in a substantially demagnetized condition. (The gaps may have a length of about .030 inch where the tape moves at 30 inches per minute and the active layer 21 is about .015 inch above the surface of the pole pieces for a 60 cycle per second A.C. field.)

It is found that when the density of magnetic particles in the coating layer 21 is increased, the maximum magnetic field strength which may be applied to the layer without smearing (retarding the movement of the particles relative to the tape base 11 to cause bunching of the particles) is decreased. Thus with higher densities of magnetic particles, either the alternating current supplied to solenoid 14 should be decreased or the vertical spacing between the pole pieces and the particles should be increased, or both.

Each of the successive fields at gaps 81–97 should act on the particles for a sufficient time to align a substantial proportion of the particles therewith. The required time of action of each successive field depends on the strength of the field, the viscosity of the binder, the velocity of tape travel, the magnetic characteristics of the particles and the change in orientation required from that produced by the previous field. It will be noted that the field direction is shifted by progressively smaller increments in the embodiment of FIGURES 4 and 5.

The coil 14 may have an axial extent of 2½ inches, a 5 inch inside diameter and a 7 inch outside diameter.

Noise level was measured with a conventional type of high impedance playback head having a gap about 0.2 mil long, followed by sensitive low-noise-level amplifiers and an indicating vacuum tube voltmeter.

Alternating current (A.C.) noise was measured under three conditions of the tape:

(1) Bulk erased.

(2) Erased with an erase head energized with high frequency alternating current.

(3) Erased with an erase head energized with high frequency alternating current followed by a record head energized with normal high-frequency bias current, but without signal current.

Direct current (D.C.) noise was measured by running the tape over a head which was magnetized to D.C. tape saturation and then sensing any output from the high impedance playback head.

Signal levels were determined by adding a signal curfent to the head under conditions (3) above, and increasing the signal current from a small value until maximum output was obtained. Signal frequencies of 200, 1000, 10,000 and "frequency of maximum response" were chosen.

In one tape produced by the method described herein with reference to FIGURES 4 and 5, the audio band noise level was more than 63 decibels below the output from a recording of saturation amplitude at 1000 cycles per second for a track width of .090 inch and a tape speed of 7.5 inches per second. A direct current noise level 53 decibels below the output from the 1000 cycles per second saturation amplitude signal was obtained under the same conditions.

*Details of milling procedure*

One procedure in milling the particles is to first apply a strong D.C. field to magnetize the particles. This can be done by means of a solenoid coil surrounding the ball mill to produce a magnetic field parallel to the axis of rotation of the ball mill. A surge of direct current may be supplied to the solenoid coil of a magnitude to produce a field of about 1000 to 2000 oersteds acting on the particles, where the particles are such as to produce a record medium exhibiting a coercive force of about 275 oersteds as described herein.

An alternating current of 60 cycles per second is then applied to the solenoid of amplitude to provide a magnetic field amplitude of about 200 oersteds (the precise optimum value being determined by simple experiment) in the vicinity of the mixture being milled. This sets up a condition where the particles tend to vibrate with respect to each other, and produces a very fine dispersion. The magnetizing and A.C. field steps may be repeated several times, all while the mixture is being milled. An example of a suitable mixture for this procedure has been given herein.

Another mode of operation is to use a variable current source (as a variac) to energize the magnetizing coil after the D.C. magnetizing step. The A.C. field is brought to 2000 oersteds momentarily, then decreased to zero and left at zero, with an extra slow decrease while going through the critical region between 400 and 150 oersteds for the powder providing a 275 coercive force. This is preferably done while milling is in operation, and may be repeated at intervals during milling.

Another mode is after the D.C. magnetizing step to set the A.C. field at an optimum value and maintain this A.C. field during the milling operation. If this value is chosen to be somewhat below the coercive force, its action on the single domain particles is similar to the first described mode. Alternating current fields of about the coercive force value or above have also been found advantageous because they cause lateral repulsive forces between adjacent particles that help to break up aggregates.

For powders of higher or lower coercive force, or where the balls are of magnetic material, the values of field in the above examples are adjusted accordingly.

The D.C. magnetizing step may be omitted in the above, particularly if single domain particles are used.

*Additional modifications*

As indicated diagrammatically at 105 in FIGURE 1, a solenoid may encircle the path 10 in advance of solenoils 13 and 14. Such a solenoid 105 may receive a direct current of value to magnetize the particles with one polarity. The particles are then subjected to a 60 cycle per second A.C. field from solenoid 13 below the coercive force value such as 275 oersteds which vibrates the particles to loosen and dislodge the particles. The particles are then subjected to an A.C. orienting field of gradually increasing amplitude reaching values above the coercive force value, after which a decreasing amplitude A.C. field leaves the particles in a demagnetized condition. The particles are then allowed to set in an oriented condition. In each of the embodiments, a drying means such as indicated at 106 in FIGURES 1 and 4 may set the coating where such action is required.

Record media such as flat rectangular sheets or disks may be oriented by applying an alternating current field in the desired direction of orientation and slowly decreasing the amplitude as a function of time while the binder is in a fluid condition, rather than by moving the record medium through a field which has decreasing amplitude as a function of distance along the record medium path.

While the speed of movement of the record medium in the coating apparatus used for experimental purposes is about 30 inches per minute, more precisely 28 inches per minute, the teachings herein described will be readily applied by those skilled in the art to record media moving at commercial coating speeds. Principally, this may require a corresponding elongation of the magnetic fields in the direction of movement of the record medium so that fields of the proper amplitude act on the particles for the same length of time. Thus solenoids 13 and 14 and the gaps between the magnetic pole pieces in FIGURES 1, 4 and 5 would be correspondingly lengthened.

*Discussion of the orienting process of the present invention*

The foregoing description is considered to be entirely adequate to enable those skilled in the art to practice the present invention; the following discussion is presented in the interest of suggesting a presently preferred explanation of the results obtained by practice of this invention.

The behavior of particles in a magnetic field depends on their size, shape, mass, magnetic susceptibility, whether they are capable of being "permanently" magnetized, whether they are necessarily permanent magnets at all times (as with single domain crystals), their magnetic properties (such as coercive force, residual magnetization, saturation density), their freedom to move or rotate in a binder, the viscosity of the suspending medium or other restrictions on motion, forces between particles (interaction), the strength, direction, frequency and length of time the magnetic field is applied, etc.

With respect to the case of particles which do not exhibit a permanent magnetic polarization and can be considered as being unmagnetized during the coating process, such particles will still exhibit magnetic susceptibility and will have magnetic poles induced at their extremities while in a magnetic field region. If the field is uniform it exerts no translating force but only a torque tending to align the particles in the direction of the field. However, the magnetic poles induced on the particles cause mutual attraction between particles that are positioned end-to-end in the direction of the field (the successive particles having poles of opposite polarity at their adjoining ends) and mutual repulsion between laterally adjacent particles. The particles tend to unite to form strings or chains in the direction of the field. Each chain repels its neighbor and tends to keep it separated. If the applied field is reversing, these forces are still the same, since the induced poles all reverse and the unlike longitudinally adjacent poles continue to attract while the like poles which are laterally spaced continue to repel.

If the particles are capable of being permanently magnetized, and an applied D.C. field is strong enough to accomplish this, the mutual magnetic forces persisting after the aligning field is removed will cause the chains to bend. Generally, the particles may be expected to break into lattice type arrangements of lower energy level. The chains are not necessarily single particles but may be overlapping masses of particles that form a good magnetic circuit.

If the particles are initially permanently magnetized then a direct current or permanent magnet field will have an aligning action although the particles will probably already be clustered in aggregates because of their magnetic forces. An alternating current magnetic field below a certain strength will tend to turn the particles first one way then the other at each reversal of the field. Under such circumstances the particles will be agitated. Such mechanical motion can be quite strong if the particles have high residual magnetization ($B_r$) and a high coercive force ($H_c$) and if the field strength and frequency are optimum for the particle size and mass. If the alternating current field strength (H) is increased beyond the coercive force of the particles, it will be able to reverse the magnetization before the particles have moved a substantial amount, so that in a strong field such particles behave in a manner similar to unmagnetized particles such as previously described herein. As the frequency of the applied field is increased, the inertia of the particles and the viscosity of the suspending agent causes the alternating current vibratory motion to be reduced until at a high enough frequency it becomes negligible. The steady alignment forces persist in all cases even at very high frequencies and are a maximum at alternating current fields which have a peak value above the coercive force of the particles, preferably near the saturation value ($B_s$) of the particles.

Previous attempts to align suspensions of magnetic particles with direct current steady amplitude or permanent magnet fields did not give the results of the present invention because of the lateral forces acting on the particles while the aligning field is present and because such forces tended to break up the alignment as soon as the aligning field is removed.

If a direct current steady amplitude field is used for alignment, it is advantageous to set the coating as by drying the tape so that the particles cannot move prior to removing the particles from the field. This can be accomplished by using a long solenoid as at 13 in FIGURE 1 supplied with direct current instead of alternating current and drying the tape before it moves out of the field as by the drying means 50 indicated in FIGURE 1 which directs warm air axially through the interior of the solenoid. A solenoid is advantageous compared to a magnet which uses magnetic material in that the direction of the magnetic field does not change as the tape passes through the field of a solenoid.

With alternating current energization of solenoid 13 or solenoids 13 and 14, the magnetic particles in layer 21 are subjected to strong aligning forces while in the main field which is preferably higher than the coercive force of the layer 21 of particles or particle-groups. As this alternating current field decreases to below a critical strength (in the vicinity of the coercive force of the layer 21) the particles will remain aligned, and about half of the particles are left magnetized in one direction while the other half are magnetized in the opposite polarity or direction, in a statistical distribution. Such opposite poled adjacent particles have strong attraction to each other (in contrast to the direct current alignment method which gives mutual repulsion because the particles are all left magnetized in a like direction by a unidirectional field). The attraction results in a finer matrix with a lower noise level and improved frequency response as compared to prior art methods. The degree of alignment is better and the particles are more closely packed resulting in greater output. Coatings of equant particles are benefited by this treatment even though they do not exhibit the degree of anisotropy attained with elongated particles.

It has been found that if the aligning field has considerable gradient, the coating is attracted bodily toward the strongest part of the field, as for example the center of the solenoid as indicated at 60 in FIGURE 1. It is therefore desirable to reduce the gradient so that such force does not harm the coating if the coating is still in a fluid condition.

With record media which are not conveniently moved continuously through an orienting field, for example, such as flat sheet or disk record media, an alternating magnet field may be applied in the desired direction of orientation and then the amplitude of the alternating field may be gradually reduced to below a minimum value before removing the record medium from the field region.

It is conceived that the reduced A.C. noise level obtained by the method of the present invention is the result of pairing saturated noisy single domain particles with oppositely magnetized particles laterally adjacent thereto during the orienting procedure. The external magnetic field of such "pairs" is a very small fraction of that of either of the individual particles, so that the reduced noise level can be understood as resulting from such a pairing action.

Although A.C. energization of the coils as 13 and 14 has been described in detail, it should be pointed out that the formulation has also given improved results with D.C. energization of these coils.

It will be apparent that many modifications and variations may be effected without departing from the scope of the novel concepts of the present invention.

I claim as my invention:

1. In a method of making an oriented magnetic record medium having magnetic particles oriented in a predetermined direction in a binder, the steps comprising (a) placing the magnetic particles on the record medium in a mobile condition, (b) subjecting the particles to a magnetic orienting field having a direction corresponding to said predetermined direction and having an amplitude effective to move the particles in the binder, (a) applying the magnetic orienting field to the record medium for a period of time sufficient to substantially align the particles in said predetermined direction, (d) thereafter subjecting the particles to a reversing polarity magnetic field of progressively decreasing amplitude having a direction generally parallel to said predetermined direction of orientation of said particles, (e) subjecting each of the particles of the record medium to a number of reversals in polarity of said magnetic field of successively reduced amplitude, and (f) immobilizing said particles in said binder after subjection to said reversing polarity magnetic field and prior to application of any further external magnetic fields of effective amplitude to reorient or magnetize said particles.

2. The method of claim 1 wherein the reversing polarity magnetic field is a high frequency alternating current field having a frequency above the audible range.

3. The method of claim 1 wherein said reversing polarity magnetic field is a high frequency alternating current field having a sufficient amplitude in the path of travel of the record medium to heat the particles substantially above the temperature of the particles prior to subjection to said reversing polarity magnetic field.

4. In a method of orienting magnetic particles of a record medium in a predetermined direction in a binder, the steps comprising (a) subjecting the particles of the record medium prior to immobilization of the particles successively in time to a plurality of magnetic orienting fields of effective strength to move the particles in the binder and directed at successive different acute angles relative to said predetermined direction, (b) subjecting the particles of the record medium to the successive magnetic orienting fields for sufficient time periods so that a substantial proportion of the particles of the record medium are oriented substantially in the directions of the respective magnetic fields in succession, (c) thereafter subjecting the particles of the record medium to a last magnetic orienting field extending substantially in said predetermined direction of orientation, and (d) immobilizing the particles in said binder while the particles have the orientations produced by said last magnetic orienting field.

5. In a method of orienting magnetic particles of a record medium in a predetermined direction in a binder, the steps comprising (a) subjecting the particles of the record medium successively in time to a plurality of magnetic orienting fields of effective strength to move the particles in the binder and directed at successive different acute angles relative to said predetermined direction of orientation of said particles, (b) subjecting the particles of the record medium to the successive magnetic orienting fields for sufficient time periods so that a substantial proportion of the particles of the record medium are oriented substantially in the directions of the respective magnetic fields in succession, (c) thereafter subjecting the particles of the record medium to a last magnetic orienting field having a direction substantially in said predetermined direction of orientation, and (d) reversing the polarity of at least the last of the magnetic orienting fields in the region thereof of effective strength to move the particles and reversing the polarity of the last of the magnetic orienting fields in said region as a function of time to subject each of the particles of the record medium to a number of reversals in polarity of said last magnetic orienting field with the amplitude of said last magnetic orienting field gradually diminishing to leave substantially one-half of the particles oriented substantially in said predetermined direction of orientation and of one polarity and to leave the other of the particles oriented substantially in said predetermined direction of orientation of the record medium but with the opposite polarity within each volume increment of the active region of the record medium having dimensions corresponding to the thickness of the active region and less than one mil, and (e) immobilizing the particles in said binder while the particles have the orientations produced by said last magnetic orienting field.

6. In a method of orienting magnetic particles, the steps comprising (a) forming an array of particles which are capable of retaining residual magnetization of different polarities in a binder on a substrate with the binder in a condition to allow movement of the particles, (b) applying to said array an external alternating polarity magnetic field having a predetermined direction and having an initial amplitude sufficient to change the polarity of magnetization of the particles, (c) decreasing the amplitude of the magnetic field acting on the particles over a sufficient number of cycles of polarity reversal to leave the array with approximately equal numbers of particles with residual magnetization of respective different polarities, (d) thereafter providing a time interval for regrouping of the particles as a result of the mutual forces therebetween to produce a resulting substantially higher degree of cancellation of the fields of the particles with respect to points external to said array at a distance from the array comparable to the thickness of the array than without said time interval, and (e) immobilizing the particles in said array after the expiration of said time interval by hardening of said binder.

7. An oriented magnetic record medium as produced by the method of claim 1 comprising a substrate having an active layer of magnetizable particles of fixed orientation in a binder characterized by the particles being oriented in a predetermined direction with sufficient parallelism and lateral alignment of adjacent particles transverse to the direction of orientation to provide an audio band noise level at least 63 db below a saturation recording at 1000 cycles per second on a .090 inch wide track moving at 7.5 inches per second.

8. An oriented magnetic record medium as produced by the method of claim 1 comprising a substrate having an active layer of magnetizable particles of fixed orientation in a binder characterized by the particles being oriented in a predetermined direction with sufficient parallelism and lateral alignment of adjacent particles transverse to the direction of orientation to provide a D.C. noise level at least 53 db below a saturation recording at 1000 cycles per second on a .090 inch wide track moving at 7.5 inches per second.

9. An oriented magnetic record medium as produced by the method of claim 1 comprising a substrate having a resin matrix having dispersed therein oriented magnetic particles, and a plasticizer compatible with said binder coated on said particles.

10. An oriented magnetic record medium as produced by the method of claim 1 comprising a substrate having a resin matrix having dispersed therein oriented magnetic particles, and a plasticizer compatible with said binder coated on said particles, said plasticizer comprising a fatty acid triglyceride.

11. Apparatus for orienting magnetic particles of a record medium in a binder comprising (a) means for placing the particles on the record medium in a mobile condition, (b) means for moving the record medium along a path of travel in an intended direction of movement of the record medium, (c) means for producing a plurality of orienting magnetic fields at successive positions along said path of travel of the record medium each having an amplitude sufficient to move the particles, (d) said moving means moving the record medium along said path of travel at a speed related to the extend of the successive orienting magnetic fields in the direction of movement of the record medium such that a substantial proportion of the particles respond in orientation to each of the fields in succession, and (e) means providing for immobilization of the particles in said binder while the particles have substantially the orientation produced by passage through the last of said orienting magnetic fields.

12. Apparatus for orienting magnetic particles of a record medium in a binder comprising (a) means for placing the particles on the record medium in a mobile condition, (b) means for moving the record medium along a path of travel in an intended direction of movement of the record medium, (c) means for producing a plurality of orienting magnetic fields at successive positions along said path of travel of the record medium each having an amplitude sufficient to move the particles, (d) said moving means moving the record medium along said path of travel at a speed related to the extent of the successive orienting magnetic fields in the direction of movement of the record medium such that a substantial proportion of the particles respond in orientation to each of the fields in succession, and (e) means providing for immobilization of the particles in said binder while the particles have substantially the orientation produced by passage through the last of said orienting magnetic fields.

(f) said field producing means producing at least a last one of said orienting magnetic fields which is of successively reversing polarity, and (g) said moving means moving the record medium out of the last of said orienting fields sufficiently slowly to subject the particles to a number of polarity reversals of said last magnetic orientation field of successively decreasing amplitude.

13. Apparatus for orienting magnetic particles of a record medium in a binder comprising (a) means for placing the particles on the record medium in a mobile condition, (b) means for moving the record medium along a path of travel in an intended direction of movement of the record medium, (c) means for producing a plurality of orienting magnetic fields at successive positions along said path of travel of the record medium each having an amplitude sufficient to move the particles, (d) said moving means moving the record medium along said path of travel at a speed related to the extent of the successive orienting magnetic fields in the direction of movement of the record medium such that a substantial proportion of the particles respond in orientation to each of the fields in succession, and (e) means providing for immobilization of the particles in said binder while the particles have substantially the orientation produced by passage through the last of said orienting magnetic fields, (f) said field producing means producing fields which extend at successive different acute angles relative to the direction of movement of the record medium to successively shift the orientation of said particles.

14. Apparatus for orienting magnetic particles of a record medium in a binder comprising (a) means for placing the particles on the record medium in a mobile condition, (b) means for moving the record medium along a path of travel in an intended direction of movement of the record medium, (c) means for producing a plurality of orienting magnetic fields at successive positions along said path of travel of the record medium each having an amplitude sufficient to move the particles, (d) said moving means moving the record medium along said path of travel at a speed related to the extent of the successive orienting magnetic fields in the direction of movement of the record medium such that a substantial proportion of the particles respond in orientation to each of the fields in succession, and (e) means providing for immobilization of the particles in said binder while the particles have substantially the orientation produced by passage through the last of said orienting magnetic fields, (f) said field producing means comprising solenoid means encircling said path of travel of the record medium and a series of pole pieces of magnetic material disposed in coupling relation to said solenoid means and having a series of non-magnetic gaps along the path of travel of the record medium and in coupling relation thereto for producing a main field extending generally longitudinally of the path of travel of the record medium and for producing a succession of magnetic fields at said non-magnetic gaps.

15. Apparatus for orienting magnetic particles of a record medium in a binder comprising (a) means for placing the particles on the record medium in a mobile condition, (b) means for moving the record medium along a path of travel in an intended direction of movement of the record medium, (c) means for producing a plurality of orienting magnetic fields at successive positions along said path of travel of the record medium each having an amplitude sufficient to move the particles, (d) said moving means moving the record medium along said path of travel at a speed related to the extent of the successive orienting magnetic fields in the direction of movement of the record medium such that a substantial proportion of the particles respond in orientation to each of the fields in succession, and (e) means providing for immobilization of the particles in said binder while the particles have substantially the orientation produced by passage through the last of said orienting magnetic fields, (f) said field producing means comprising solenoid means encircling said path of travel of the record medium and a series of pole pieces of magnetic material disposed in coupling relation to said solenoid means and having a series of non-magnetic gaps along the path of travel of the record medium and in coupling relation thereto for producing a main field extending generally longitudinally of the path of travel of the record medium and for producing a succession of magnetic fields at said non-magnetic gaps, (g) and means for supplying an alternating current to said solenoid means to produce alternating magnetic fields in the path of travel of the record medium.

(References on following page)

References Cited by the Examiner

UNITED STATES PATENTS

| | | | |
|---|---|---|---|
| 1,785,283 | 12/1930 | Podszus | 117—100 |
| 1,873,223 | 8/1932 | Sherwood | 117—100 X |
| 2,678,880 | 5/1954 | Nuesch | 117—100 |
| 2,711,901 | 6/1955 | Von Behren. | |
| 2,796,359 | 6/1957 | Speed. | |
| 3,001,891 | 9/1961 | Stoller | 117—93.2 |

| | | | |
|---|---|---|---|
| 3,026,215 | 3/1962 | Fukuda et al. | 117—93.2 |
| 3,061,454 | 10/1962 | Graf et al. | |
| 3,117,065 | 1/1964 | Wootten. | |

WILLIAM D. MARTIN, *Primary Examiner.*

MURRAY KATZ, *Examiner.*

H. E. COLE, *Assistant Examiner.*